Sept. 30, 1930.                A. HADLEY                1,776,898
                            BRACELET COUPLING
                            Filed Dec. 31, 1929
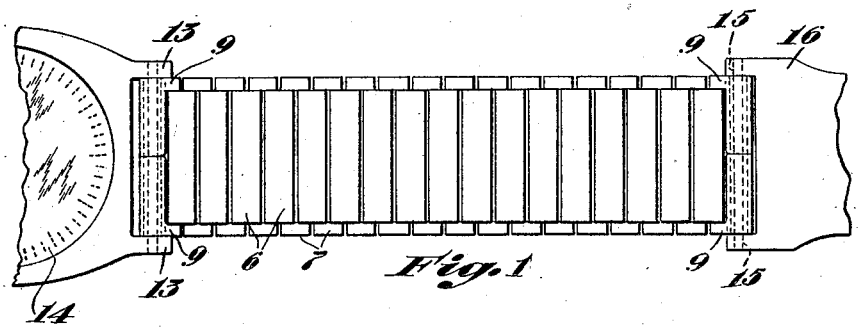
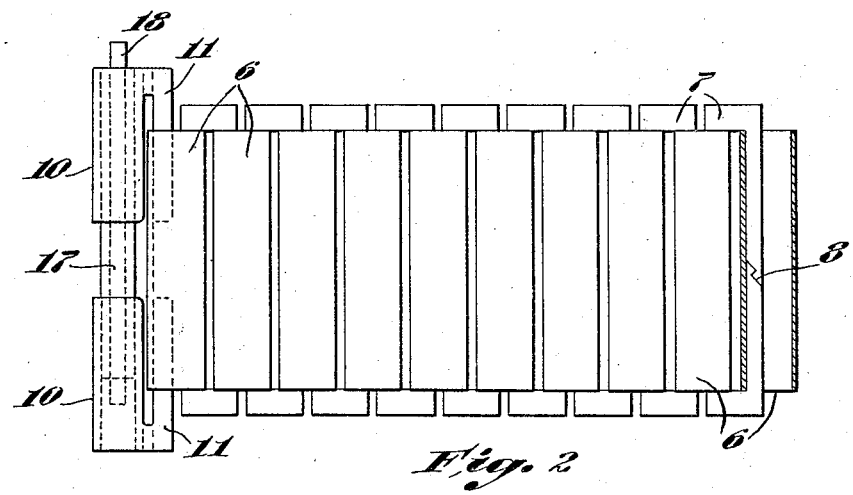
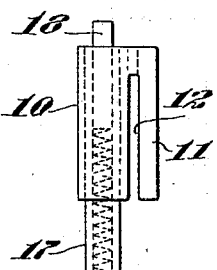
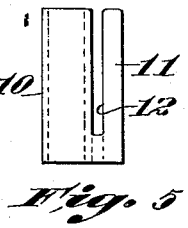
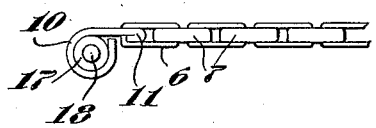
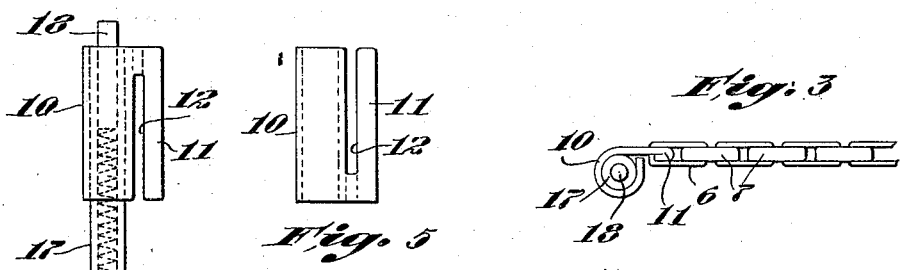

Patented Sept. 30, 1930

1,776,898

UNITED STATES PATENT OFFICE

ART HADLEY, OF PROVIDENCE, RHODE ISLAND, ASSIGNOR TO THE HADLEY COMPANY, INC., OF PROVIDENCE, RHODE ISLAND, A CORPORATION OF RHODE ISLAND

BRACELET COUPLING

Application filed December 31, 1929. Serial No. 417,663.

This invention relates to couplings for detachably securing a bracelet end to a wrist watch or the like, and has for its principal object the provision of a separable coupling which may be quickly and easily applied to the end link of a flexible bracelet of the type comprising a series of hollow links or tubes and interconnecting staples having legs extending into and secured within adjacent tubes, and which may be held in attached position by pivoting the coupling between the usual attachment lugs of a wrist watch or the like.

A recommended embodiment of the invention is illustrated in the accompanying drawings in association with a flexible link bracelet constructed substantially as described in my copending application Serial No. 365,092, filed May 22, 1929, but the improved coupling may obviously be employed with other types of bracelets having a hollow end link to receive the coupling.

In the drawings,

Fig. 1 is a top view of a link bracelet having its respective ends attached to a wrist watch and a bracelet connector by means of the improved couplings;

Fig. 2 is an enlarged view showing the mode of applying the coupling to the bracelet;

Fig. 3 is an edge view of the bracelet and coupling;

Figs. 4 and 5 are details of the coupling elements; and

Fig. 6 is a fragmentary sectional view of a pintle member forming part of the coupling.

The illustrated bracelet comprises a plurality of hollow links 6 interconnected in parallel relation by staples 7 having their legs received within opposite ends of adjacent links and straddling the contiguous walls thereof. The ends of the corresponding legs of each complemental pair of staples are interlocked, as by interengaging projections and recesses on the overlapping ends shown at 8 (Fig. 2). In other forms of similar flexible link bracelets, for example in the structure shown in the patent to Brandt No. 1,708,466, dated April 9, 1925, the staple legs are interlocked with projections on the walls of the tubes.

In order to decrease the length of a bracelet or bracelet section of this type, it is customary to pull out the staples in order to remove the required number of links; and this operation often results in deformation of the staples so that they can not be replaced. Accordingly it is impractical to attempt to adjust the bracelet length by removing links intermediate the ends of the bracelet, and as the end links of the bracelets heretofore in use usually had a coupling member permanently fastened thereto, the adjustment could not conveniently be made at the bracelet end.

It is accordingly the principal purpose of the present invention to provide a separable couling for attachment to the end link, so that the coupling may be detached to permit the removal of a number of links and again attached to the link at the end of the adjusted bracelet. To the attainment of this purpose, the coupling comprises a pair of similar members, indicated generally at 9 in Fig. 1, and each member preferably includes a tubular body or sleeve portion 10 and a hook portion 11 fixed at one side of and preferably parallel to the body portion. The coupling members may be conveniently formed from a blank of sheet metal by rolling one end of the stock to produce the sleeve 10 and cutting a slot 12 between the body and the hook 11. As shown in Fig. 3, the hook portion may be folded upon itself during the forming operation to provide double thickness of the material, if desired.

The hooks 11 of the respective coupling members are formed to slide within the opposite ends of the terminal link 6 in the same manner as the legs of the staples 7, but the hooks are not interlocked or otherwise fastened directly to the link. The coupling members are preferably held in attached position on the bracelet end by pivoting the sleeve portions thereof between the customary lugs 13 of a wrist watch 14 or similar lugs 15 of a bracelet attachment 16, as shown in Fig. 1, the pivot pins or pintles which connect the coupling with the lugs being detachably mounted to permit easy separation of the parts. Thus the pintle preferably includes a barrel 17 which fits in the aligned sleeve portions 10 and a pair of spring pressed tips 18 which are received in the usual manner within aligned apertures in the lugs, and which are retained within the valve by inturned shoulders at the ends of said barrel as indicated in Fig. 6.

In order to attach the bracelet end to the wrist watch, one or both of the tubular portions of the coupling members are telescoped over a portion of the barrel 17 and the hooks 11 are inserted at the opposite ends of the bracelet end link, as indicated in Fig. 2. The coupling members are then pushed together endwise upon the barrel 17, leaving the tips 18 protruding at opposite ends, and the coupling is attached between the lugs 13 by depressing the tips which will then spring outwardly into the lug apertures.

A coupling constructed and arranged as above described is simple and economical to manufacture, easy to apply upon a bracelet end and to attach to a watch or other article of jewelry, neat and compact in structure, and attractive in appearance. It will be understood, however, that structural details of the devices herein described may be varied to suit particular purposes without departing from the essence of this invention as defined in the following claims.

I claim:

1. A coupling for detachably connecting the end link of a bracelet with a wrist watch or the like having projecting lugs, comprising a pair of separable members each having a hook portion and a sleeve portion, the respective hook portions being received within the opposite ends of said link with the sleeve portions in alignment, and means passing through the aligned sleeves for removably securing the aligned sleeve portions between said lugs.

2. A coupling for detachably connecting the end link of a bracelet with a wrist watch or the like having projecting lugs, comprising a pair of separable members each having a hook portion and a sleeve portion, the respective hook portions being received within the opposite ends of said link with the sleeve portions in alignment, and means passing through the aligned sleeves for pivotally securing the aligned sleeve portions between said lugs.

3. A coupling for detachably connecting the end link of a bracklet with a wrist watch or the like having projecting lugs, comprising a pair of separable members each having a hook portion and a sleeve portion, the respective hook portions being received within the opposite ends of said link with the sleeve portions in alignment, and a pintle passing through the aligned sleeve portions and removably supported by said lugs for holding the sleeve portions between the lugs.

4. A separable coupling for detachably connecting a hollow link at the end of a bracelet with a wrist watch or similar article having a pair of parallel, spaced projecting lugs, comprising two similar coupling members each having a sleeve and an integral hook extending parallel thereto, the respective hooks being received within the opposite open ends of said link and the sleeves being disposed in end-to-end alignment between said lugs, and a pintle passing through the aligned sleeves and having its ends projecting into said lugs, the pintle being removable from the lugs and from at least one of the sleeves to permit detachment of the coupling members from the link.

5. A separable coupling for detachably connecting a hollow link at the end of a bracelet with a wrist watch or similar article having a pair of parallel, spaced projecting lugs, comprising two similar coupling members each having a sleeve and an integral hook extending parallel thereto, the respective hooks being received within the opposite open ends of said link and the sleeves being disposed in end-to-end alignment between said lugs, and a barrel passing through the aligned sleeves, the barrel having spring-pressed tips detachably mounted in said lugs, whereby the barrel may be separated from the lugs and from the sleeves to permit detachment of the coupling members from the link.

Signed by me at Providence, Rhode Island, this seventeenth day of December, 1929.

ART HADLEY.